Figures 1, 2:
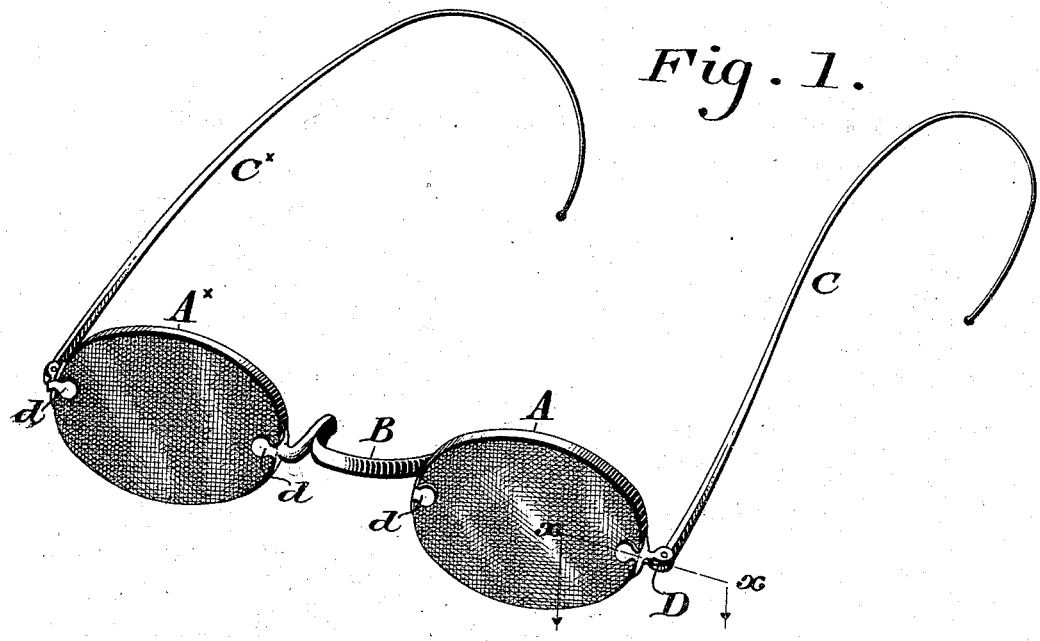

(No Model.)

J. E. PARKER.
SPECTACLES OR EYEGLASSES.

No. 542,534. Patented July 9, 1895.

WITNESSES:
F. Norman Dixon
Thomas K. Lancaster

Joseph E. Parker,
INVENTOR
By his Attorneys

UNITED STATES PATENT OFFICE.

JOSEPH E. PARKER, OF PHILADELPHIA, PENNSYLVANIA, ASSIGNOR TO IVAN FOX, OF SAME PLACE.

SPECTACLES OR EYEGLASSES.

SPECIFICATION forming part of Letters Patent No. 542,534, dated July 9, 1895.

Application filed February 20, 1894. Serial No. 500,922. (No model.)

*To all whom it may concern:*

Be it known that I, JOSEPH E. PARKER, a citizen of the United States, residing in the city and county of Philadelphia, in the State of Pennsylvania, have invented certain new and useful Improvements in Spectacles or Eyeglasses, of which the following is a specification.

In the manufacture of spectacles and eyeglasses in which rims for the lenses are dispensed with, the attachment of the temples and nose-bridge in spectacles and of the spring connecting-bow and nose-rests in eyeglasses to the lenses has heretofore been effected by the employment of clasps, the clasping side plates of which embrace the edges and to a limited extent overlap the faces of the lenses and are secured thereto by a bolt, screw, or rivet which passes through both side plates of each clasp and a hole drilled through the lens. This mode of attachment is objectionable because of the cost and unsightliness of the screws, and because, also, of the expense attendant upon the application of the screws.

It is the object of my invention to dispense entirely with screws, bolts, or rivets as a means of securing the clasps to the lenses, and, while still employing the well-known form of clasp, to secure it effectually to the lens without boring its clasping side plates and without the use of any fastening device passing through the substance of said plates. This object I accomplish by forming the usual screw-holes in the lenses, filling them with tin or other metal or material which can be fused or soldered or similarly united to the metal, alloy, or other material of which the clasps are composed, by applying the clasps in the usual manner and so that their side clasping-plates cover over and inclose the hole and its contents, and by then applying heat to the clasp-plates to effect the fusion or melting of the plug or filling within the hole in the lenses, and its consequent soldering, cementation, or kindred union to the inner faces of said clasp-plates.

In the practice of my invention the holes in the lenses and also the clasps and their attachments are made in the usual manner, while the clasps possess any usual or preferred form, conveniently that represented in the accompanying drawings. The filling or plugging of the holes in the lenses is conveniently accomplished either by filling said holes with the desired filling material when in a heated, fluent, or plastic condition, or else by forcing a plug of metal wire, the diameter of which is slightly in excess of that of the hole, into and through the latter and then cutting it off flush with both surfaces of the lenses. The union of the plug or filling to the inner faces of the side plates of the clasps is conveniently effected by the employment of, for instance, nipper-tongs, tweezers, or pinchers, preferably formed with ball or cone pointed jaws adapted to take over the clasp side plates, and which, when themselves heated and applied to grasp the plates, transmit their heat through the substance of the metal of said plates, so as to form between them and the plug or filling within the hole a union of cementation or soldering.

Of course, if desired, the clasps may be previously heated and applied in the heated condition over the filling within the hole. I do not, therefore, restrict myself to the means by which the heating is performed.

In the accompanying drawings I have illustrated in Figure 1 a pair of spectacles embodying my invention, in that the clasps represented are assumed to have been secured to the lenses represented by the practice of my invention already described. Fig. 2 is a longitudinal fragmentary sectional detail in the plane of the dotted line $x\ x$, and sight being taken in the direction of the arrows applied to said line through the right-hand templeclasp shown in Fig. 1 and through a portion of the right-hand lens A.

In the drawings, in which similar letters of reference indicate corresponding parts, $A\ A^\times$ are the lenses. B is the connecting bow or bridge. $C\ C^\times$ are the temples. D are the clasps, of the usual form; and $d$ the side or clasping plates of said clasps.

E, Fig. 2, is the plug or filling within the hole $e$ through the lenses.

Having thus described my invention, I claim and desire to secure by Letters Patent—

1. In an eye glass or spectacle, a clasp for holding a lens, formed with side plates which embrace the edge of said lens and inclose or cover a hole formed through it and containing a filling the extremities of which are fused soldered or similarly united with the inner faces of said plates, substantially as set forth.

2. An eye glass or spectacle lens combined with a carrying clasp by a concealed joint composed of a metallic pin inclosed within and passing through a hole through the lens beneath the clasp side plates, and secured to said side plates by a soldered joint, substantially as set forth.

In testimony that I claim the foregoing as my invention I hereunto sign my name this 5th day of February, A. D. 1894.

JOSEPH E. PARKER.

In presence of—
J. BONSALL TAYLOR,
F. NORMAN DIXON.